United States Patent Office 3,484,513
Patented Dec. 16, 1969

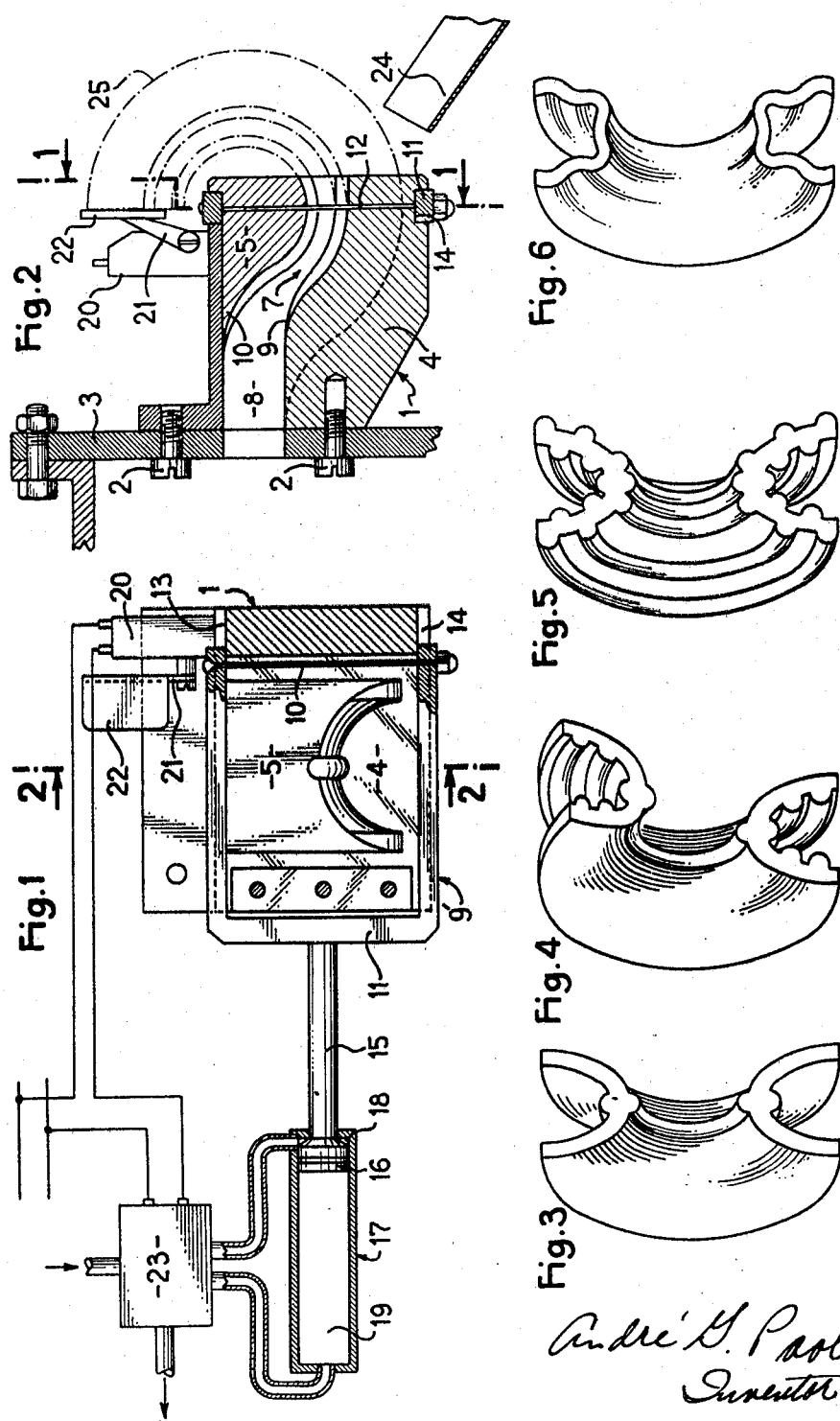

3,484,513
METHOD FOR EXTRUDING OBJECTS OF PLASTIC MATERIAL
Andre G. Paoli, Paris, France, assignor to Compagnie Generale des Produits Industriels et de Synthese "C.O.G.E.P.R.I.S.," Toulouse, France, a French body corporate
Filed Oct. 31, 1966, Ser. No. 590,949
Claims priority, application France, Nov. 3, 1965, 37,033
Int. Cl. B29c 17/14; B30 11/22
U.S. Cl. 264—148                                4 Claims

ABSTRACT OF THE DISCLOSURE

A method for forming objects, such as filling or packing saddles used in treatment towers, said method comprising continuously extruding a plastic material through an arcuate die, coiling the extruded product at the outlet of the die through at least 180°, and cutting said product at or adjacent the outlet section of the die, without stopping the extrusion.

---

The present invention relates to methods for producing objects of plastic material and in particular for producing ceramic filling saddles employed in the chemical industry.

Saddles already employed for chemical treating towers are produced from plastic clay in the following manner:

A U-shaped strip is first extruded and then given the shape of a saddle by pressing it between respectively male and female surfaces of two rolls. The saddles are cut off and ejected from the female roll. The latter must be stopped and started up again for each operation. The saddles are thereafter subjected to a baking operation.

This known manufacturing method has many drawbacks. The equipment required is complicated and consequently costly. Moreover, the saddle is produced by two distinct operations, namely the extrusion and the forming. Further, the fact that the saddle is formed on rolls limits the angle which the saddle can subtend at the centre to 180°, since it must be possible to strip the saddle from the female roll; further, certain limitations are imposed in the shape of its section.

The object of the present invention is to provide a method for producing objects having shapes similar to that of said saddles which avoids the drawbacks of the conventional method, namely a method which continuously produces objects of any section the angular development of which could exceed 180°, in a single operation with simple equipment and consequently at a higher production rate and a distinctly lower cost price.

The method according to the invention for extruding objects of plastic material whose shape is obtained by the rotation of any section about an axis located outside said section, and in particular lining saddles employed in the chemical industry, comprises extruding the plastic material through an extruding die, wherein said die has a plane inlet section and a plane outlet section, said sections being substantially parallel, in which said material describes approximately an arc of a circle and from which it issues in coiling in accordance with an arc of a circle, and cutting off the product obtained at or adjacent the outlet section of the die, without stopping the extrusion, when a given length of said product has been extruded.

Another object of the invention is to provide an apparatus for carrying out the aforementioned method. Said apparatus comprises, disposed at the outlet end of an extruding machine, a die having a passage the mean line of which has roughly the shape of an arc of a circle, and means at the outlet of the die for cutting off the product extruded when the latter reaches a predetermined length.

Further features and advantages of the invention will be apparent from the ensuing description with reference to the accompanying drawing.

In the drawing:

FIG. 1 is a sectional view of an apparatus according to the invention, taken along line 1—1 of FIG. 2 with parts cut away;

FIG. 2 is a partial sectional view taken along line 2—2 of FIG. 1; and

FIGS. 3, 4, 5 and 6 are views of various types of saddles which can be obtained by means of the method according to the invention, the saddle shown in FIG. 3 corresponding to that produced by the apparatus shown in FIGS. 1 and 2.

In the selected example, the method according to the invention is employed for producing by extrusion lining saddles intended for the chemical industry.

The apparatus for carrying out said method is shown in FIGS. 1 and 2 and comprises a drawing die 1 fixed by screws 2 to the outlet face 3 of a known extruding machine (not shown). To facilitate machining, the die 1 comprises three parts: a female part 4, a male part 5 and a cap which define a passage 7.

At the entrance 8 of said passage, the parts 4 and 5 are radiused or chamfered at 9 and 10 so as to facilitate the flow of the material issuing from the extruding machine.

The mean line of the passage 7 has roughly the shape of a quarter of a circle, having a first arcuate portion having a first concavity and a second arcuate portion tangent to said first portion and having a concavity opposed to said first concavity, and the shape of the cross section of the passage at the outlet end can be seen in FIG. 2.

Mounted adjacent the outlet of the die 1 is a cutting device 9' which comprises a steel wire 10 held taut on a bow 11. The wire 10 moves in a slot 12 in the die and the two branches of the bow 11 are guided in two cavities 13, 14 respectively provided on the outer faces of the parts 5 and 4. The bow 11 is secured to a rod 15 which is rigid with a piston 16 of a double-acting air jack 17 having two chambers 18 and 19.

Located above the die 1 is a micro-switch 20 having an actuating lever 21 which terminates in a plate 22. A spring disposed in the micro-switch biases the lever 21 in the direction of the front part of the machine (the right side as viewed in FIG. 2). The setting of the lever 21 on its spindle predetermines the angular development of the products obtained.

The micro-switch 21 actuates an electro-valve 23 whose operation is such that when it receives an electric signal it reverses the supply of compressed air to the jack 17.

The extruded product 25 is shown in dot-dash line in FIG. 2.

The apparatus according to the invention operates in a particularly simple manner:

The plastic product (for example composed of moist clay) issuing from the extruding machine enters the passage 7, and the latter imparts thereto the required shape. The product issues from this passage in coiling in accordance with an arc of a circle. When the product 25 reaches the position shown in FIG. 1, it bears against the plate 22 which closes the micro-switch 20. The latter actuates the electro-valve 23 and causes compressed air to be sent to the chamber 18 of the jack 17 so that the piston 16 moves towards the left (as viewed in FIG. 1) and draws along the rod 15 and the bow 11 carrying the wire 10 which cuts off the trailing end of the continuously extruded product before it reaches the outlet section of the die to obtain the desired length.

This wire moves very quickly so that the extrusion can be carried out in a continuous manner without stopping the apparatus when cutting off the product.

When the extruded product reaches once more the position shown in dot-dash line shown in FIG. 1, and actuates the micro-switch 20, the piston, and consequently the bow and wire, move in the opposite direction.

The travel of the bow is limited by the amplitude of the travel of the piston; this travel can be limited by abutments.

The product thereafter drops onto an inclined trough or chute 21 in which it slides to a conveyor belt (not shown) which feeds the product to the drying stations and subsequently the baking stations.

FIG. 3 shows a conventional type of saddle obtained by the method according to the invention and FIGS. 4, 5 and 6 show three other types having a greater specific area which cannot be produced by the conventional method.

Thus, there could also be disposed on the outlet face of the same extruding machine one or a plurality of drawing dies such as that shown.

The micro-switch which controls the operation of the cutting device could be replaced by a photoelectric cell device.

The air jack could be replaced by an electromagnetic device.

Having now described my invention what I claim as new and desire to secure by Letters Patent is:

1. A method for forming objects of plastic material, such as filling saddles employed in the chemical industry, said method comprising continuously extruding the plastic material through an extruding die presenting, in the machine direction, a mean line having a first arcuate portion having a first concavity and a second arcuate portion tangent to said first portion and having a concavity opposed to said first concavity, coiling the extruded material at the outlet of the die in accordance with said second concavity through at least 180° and cutting off the extruded product at or adjacent the outlet of the die, without stopping the extrusion of said material.

2. A method as claimed in claim 1, wherein the free end of the extruded product is used to operate means for cutting off the extruded product.

3. A method as claimed in claim 1, wherein the extruding die has a plane inlet section and a plane outlet section, said sections being substantially parallel.

4. A method as claimed in claim 1, wherein the trailing end of the continuously extruded product is cut off before it reaches the outlet section of the die.

References Cited

UNITED STATES PATENTS

| 2,734,245 | 2/1956 | Chamberlain | 264—280 |
| 2,751,658 | 6/1956 | Gibboney | 25—39 |
| 3,060,503 | 10/1962 | Eckert | 264—285 |

ROBERT F. WHITE, Primary Examiner

JEFFERY R. THURLOW, Assistant Examiner

U.S. Cl. X.R.

25—11, 17; 264—177, 285, 295